United States Patent [19]
Maruichi

[11] 3,930,958
[45] Jan. 6, 1976

[54] DESALINATION APPARATUS

[75] Inventor: Nobuo Maruichi, Ikeda, Japan

[73] Assignee: Zeoplant Co., Ltd., Osaka, Japan

[22] Filed: May 29, 1974

[21] Appl. No.: 474,192

[52] U.S. Cl. .................... 202/174; 159/18; 159/15; 159/17 P; 202/173
[51] Int. Cl.² .... B01D 1/22; B01D 1/26; B01D 3/02
[58] Field of Search ....... 159/15, 18, 17 P; 202/158, 202/173, 174

[56] References Cited
UNITED STATES PATENTS

| | | | |
|---|---|---|---|
| 735,348 | 8/1903 | Deininger et al. | 159/15 |
| 1,768,179 | 6/1930 | Welch | 159/15 |
| 2,446,997 | 8/1948 | Brewer et al. | 159/18 |
| 3,198,241 | 8/1965 | Baird | 159/18 |

Primary Examiner—Jack Sofer
Attorney, Agent, or Firm—Tab T. Thein

[57] ABSTRACT

Desalination apparatus with the double feature of condensation and evaporation, comprising plural dish-like condensing elements piled coaxially, wherein a sloped bottom diaphragm is provided in each element, at the lower part of each of which an upwardly diverging duct is provided. A cooling pipe is led through the ducts of the elements. A depending pipe is provided near the outer edge of each element, through which the supplied sea water flows from an upper element to a successive lower element. The lowest condensing element is heated or is filled up with water that is hotter than the supplied sea water. The distilled water obtained on each condensing element is withdrawn from the lower edges of the ducts as a result of evaporation from the elements and subsequent condensation on the undersides of the diaphragms.

7 Claims, 6 Drawing Figures

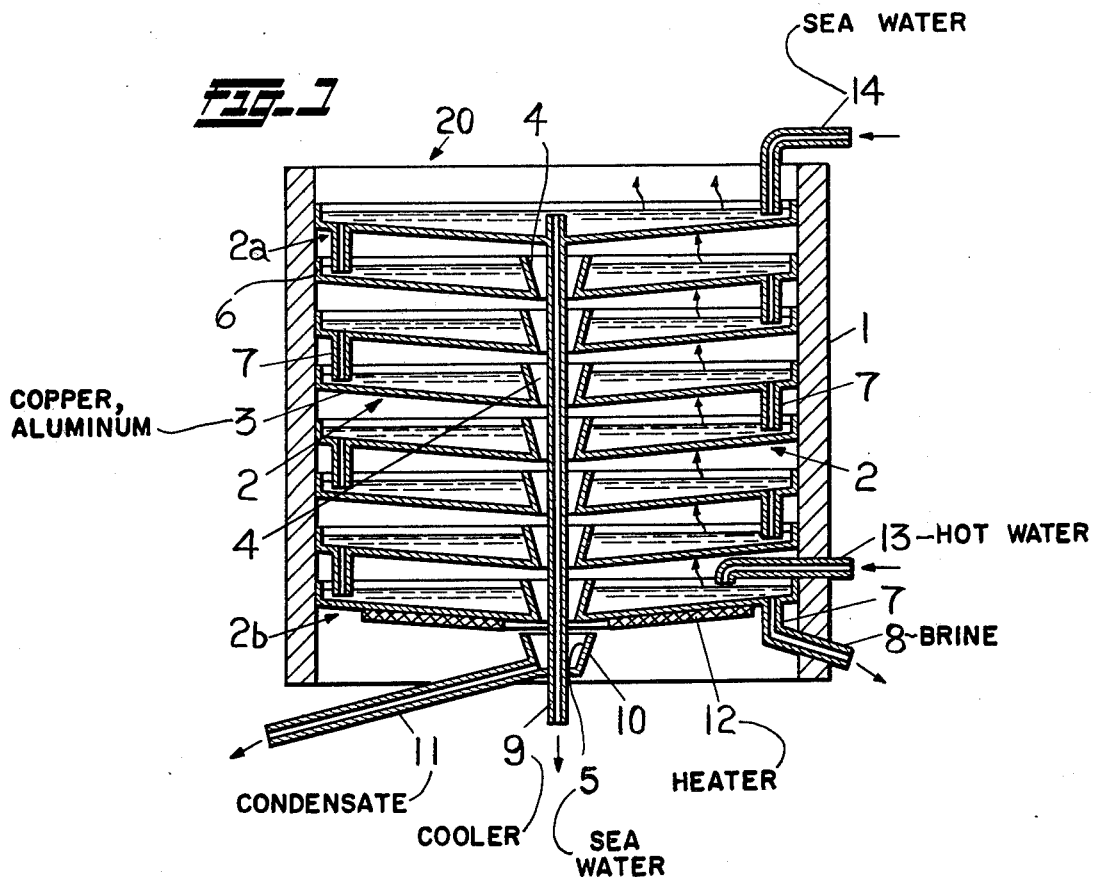
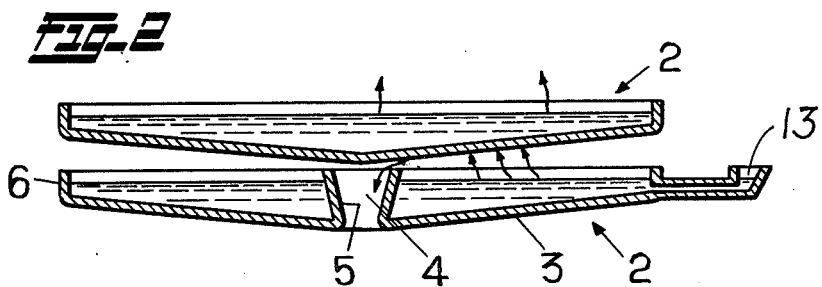

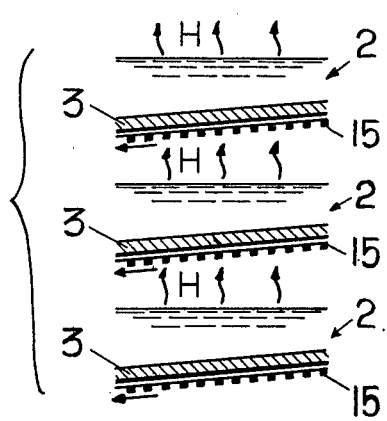
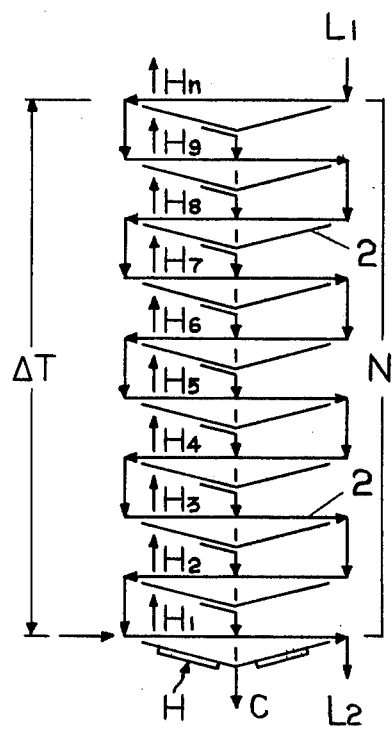
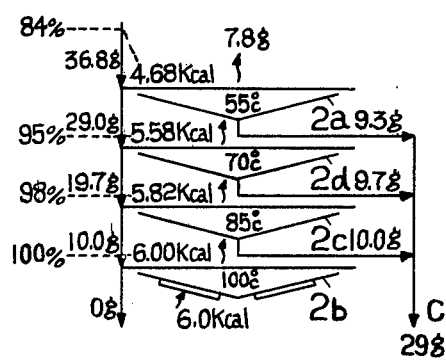
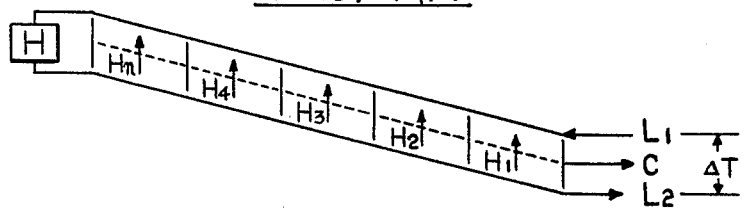

DESALINATION APPARATUS

This invention relates to a sea-water distilling or desalination apparatus, namely an apparatus which comprises coaxially piled plural dish-like desalination elements with inwardly and downwardly sloping bottom diaphragms, for the double purpose of evaporation and subsequent condensation, as will be described.

Shortage of drinking water caused by a cityward tendency of the population as well as world-wide population growth can be solved by obtaining fresh water from the unlimited sea water. The most general and simple method of obtaining fresh water from sea water is distillation, by which the vapor produced from salt water is separated from the salt so as to condense fresh water therefrom.

In the process of distillation, the vapor evaporates from the salt water by the energy of evaporation heat, and then condenses, separating from the salt by the deprivation of condensation heat. If we re-use the condensation heat for the next step, the product water efficiency increases considerably.

Therefore, the principal object of this invention is to provide a multi-effect desalination apparatus (performing both evaporation and condensation of salt water), wherein the effective utilization of thermal differences is achieved by leading the sea water between the fixed thermal differences and making use of the calorie of vapor for the above explained double purpose and effect.

Another object of the invention is to provide a desalination apparatus of the kind described which has a low thermal cost because vapor rapidly condenses therein.

It is known that the cost of fresh water obtained from sea water is determined by the main cost necessary for the basic installation, plus the cost for operating maintenance of the installation, and the energy being used.

A further object of the invention is to provide a multi-effect desalination apparatus having a simple structure wherein the tops and the bottoms of the condensing elements are utilized as evaporation and condensation surfaces of vapor, respectively.

Other objects and many of the attendant advantages of the invention will be readily appreciated as the same becomes better understood by reference to the following detailed description, when considered with the accompanying drawings, wherein:

FIG. 1 is a vertical sectional view of an exemplary embodiment of the desalination apparatus embodying this invention;

FIG. 2 is a vertical sectional view of one condensing element forming part of the apparatus;

FIG. 3 is a fragmentary enlarged sectional view of several condensing elements;

FIG. 4 is a thermal distribution illustration in the inventive apparatus;

FIG. 5 is a thermal computation in the inventive apparatus; and

FIG. 6 is a thermal distribution presentation in a conventional apparatus, for comparison with the presentation of FIG. 4.

Referring first to an exemplary apparatus 20 embodying this invention as shown in FIGS. 1 and 2, it is composed of several inwardly sloping condensing elements 2 substantially vertically piled up or superposed coaxially in a container 1, which elements are dish-like and have a slight downward slope at the lower part of an inwardly sloping bottom diaphragm 3 forming part of each condensing element, from the edge toward the center, where an opening or duct 4 is provided that widens or diverges upwardly. The bottom diaphragm 3 has an outer wall 6 the height of which is not less than that of an inner wall 5 forming the opening 4.

Each bottom diaphragm 3 also has a vertical discharge pipe 7 (see FIG. 1) near its outer edge, the bottom of which leads to the substantially planar top or rim of the successive condensing element 2 therebelow. The pipe 7 of a lowermost condensing element 2b leads to an outlet tube 8. A cooling pipe 9 is provided through all ducts 4 which constitute a continuous axial passage through the structure, and its top projects into a topmost element 2a and is fixed therein, the top being below the liquid level in the element 2a. The latter is in substance the same as the other condensing elements 2, and their difference exists only in that element 2a has no opening or duct.

The condensing elements 2, 2a, 2b are piled coaxially, a receiver 10 being provided under the lowest duct 4, and a drain pipe 11 is provided with the receiver. A schematically shown heat source 12 is provided under the lowest element 2b, or alternatively a hot-pipe 13 is provided (both shown in FIG. 1) which supplies hot water from another device (not shown) through the container 1 to the top or rim of the element 2b. In addition, an inlet or feed tube 14 is provided on the top element 2a, which supplies the sea water, possibly from another device.

Considering the above-described structure, this apparatus is quite similar to conventional rectification apparatus comprising plural piled trays. Accordingly, the temperature distribution which changes downwardly and the heat movement in this apparatus resemble those of the conventional rectification apparatus.

However the difference exists in that vapor is made to condense on the surfaces of the bottom diaphragms 3, having slight inward slopes in this inventive apparatus, along which the condensed water is gathered at the center, and is led to the outside (e.g. to tube 8).

Now, some condensate may fall dropwise into the condensing elements 2 if the water gathering action is expected only by the way of gravity. So to insure and increase the water gathering action it is preferable, according to the invention, that the surface tension operating to the diaphragm surface is strengthened in the filmwise growth of the condensed water.

Therefore, the bottom diaphragms 3 are made of copper or aluminum material in FIG. 3, under which meshed or woven layers 15 may be provided. So dropwise condensation does not occur as the water gathering action is increased by the obtained surface tension.

For example, when the diameter of the condensing elements 2 is 500 millimeters and the difference of height between the outer edges of the diaphragms 3 and their centers is less than 20 millimeters, it appears that the condensed water film adhering to the lower surfaces of the diaphragms 3 falls into the successive condensing elements 2 below them, due to the dropwise growth of the condensed water.

But when the meshed or woven layers 15 are provided under at least some diaphragms 3, as mentioned before, the condensed drops do not fall even if the above-mentioned height difference is less than 5 millimeters. In this case it is possible that the layers of evaporated vapor (the interval between each evaporation surface and condensed surface) be made 5 to 10 millimeters thick in the centers and 15 to 20 millimeters at the outer edges. In addition, the piled pitch of or separation between the condensing elements 2 can be shortened to 15 to 20 millimeters. Therefore, the time of the vapor state becomes very short, and the loss of heat becomes accordingly small when the apparatus is not in a complete adiabatic state.

When in operation, the sea water, namely salt water, is made to flow into the top element 2a through the inlet tube 14 and stored in it, the surplus of which flows successively down to the lower condensing elements 2 through the pipes 7. At the same time, the above-mentioned surplus water flows downward through the cooling pipe 9. Under the condition that all elements are filled with sea water, the lowest element 2b is heated by the source 12, or is supplied with hot water through the pipe 13. Then the water in the element 2b evaporates and the evaporated vapor condenses against the lower surface of the bottom diaphragm 3 of the upper element 2 above it and is liquified. The liquid moves toward the center along the lower diaphragm surface and gathers in the receiver 10 along the cooling pipe 9 via the openings or ducts 4.

When the vapor condenses, the condensation heat is taken up by the water in the element 2 just above as the sensible heat through its adhering bottom diaphragm 3, and is utilized as evaporation heat, again to evaporate the water.

Each element 2 produces distilled or fresh water by repeating this fundamental principle, which water gathers in the receiver 10 via the ducts 4. The cooling pipe 9 passes through the ducts 4 also to prevent the distilled water from evaporating again.

In general, the calories supplied by the heat source (12 or 13) are used in the form of both latent and sensible heat. Now, in the inventive desalination apparatus, the depth of water of each condensing element is very shallow because the slope of the bottom diaphragm 3 is very small, as described previously. So most of the calories supplied by the heat source may be used as latent heat.

First, in the lowest condensing element 2b, the larger part of the calories given by the heat source may be used in the form of latent heat for the evaporation of the sea water, and then the vapor having the latent heat will appear between the lowest condensing element and the next higher step.

When this vapor adheres to the bottom of the second condensing element 2, namely to the underside of the next higher diaphragm 3, condensation heat appears, and condensed or pure distilled water is obtained simultaneously. Most of the condensation heat will thus be used as evaporation heat for the above-mentioned reason.

Therefore, the more the number of the elements is increased, the more movement of calories takes place, as is shown in FIG. 4 at H1, H2, . . . H$n$, and the more the quantity of the condensed water increases.

Referring again to FIG. 4, the water temperature in the condensing elements increases as we descend along the elements because a small part of the calories supplied by the heat source is used as sensible heat, that is, for increasing the water temperature. The difference $\Delta T$ of the temperature of the treated sea water L1 and that of the remaining water L2 appears.

If the apparatus has N elements and the calories H supplied to element 2b are used for the production of fresh water C, a temperature $[1/(N - 1)] \Delta T$ may approximately be distributed to each element 2. The total quantity of fresh water C is the difference between the quantity of the introduced sea water L1 and that of the remaining water L2, i.e. the quantity of reduction.

A simple experiment was carried out to prove the above hypothesis. In FIG. 5, an experimental temperature distribution of the condensing elements is shown. Under the condition that the exemplary apparatus has three elements, to the top of which element 2a is added, a quantity of 36.8 grams water with a temperature of 25°C was poured in per minute; to the lowest element 2b heat of 6 K calories was imparted per minute; and further the temperature of the water in the elements 2b, 2c, 2d and 2a (as identified in FIG. 5, independently of the indications "2a" and "2b" elsewhere) increased to 100°, 85°, 70° and 55°C, respectively.

The quantity of the obtained fresh water was 10, 9.7 and 9.3 grams (total amount 29 grams) from the elements 2c, 2d and 2a, respectively, while vapor of 7.8 grams evaporated freely from the top element 2a.

Thus the introduced water of 36.8 grams, which was poured into the top element 2a per minute, decreased to 29, 19.7 and 10 grams as it passed downward, and at the end, concentrated salt water of 0 gram per minute was found in the lowest element 2b.

If 600 calories are necessary for obtaining 1 gram of fresh water, it may be understood from the above experimental data that 10 grams × 600 calories = 6 K calories are consumed in the second-step element 2c, which makes 100% of produced water efficiency for the 6 K calories that are supplied from the first-step element 2b per minute.

Furthermore, 9.7 grams × 600 calories = 5.85 K calories are consumed in the third-step element 2d, and 9.3 grams × 600 calories = 5.58 K calories in the top element 2a, which proves the level of 98 and 95% respective water product efficiency. Therefore, the estimated values, that is 100, 98 and 95%, clearly prove the above hypothesis.

In a multi-stage apparatus of the conventional type as shown schematically in FIG. 6, the sea water L1 increases in temperature, gradually receiving latent heat of vapor in the form of sensible heat H1, H2, . . . H$n$, and it is evaporated in several stages after being heated in the last step, and then it flows off as the remaining water L2.

As compared with the conventional multi-stage evaporative apparatus wherein the water bears heat in the form of sensible heat, in the desalination apparatus embodying this invention, the rise of water temperature by sensible heat is very small, and most part of the latent heat by vapor is used for the evaporation of the water, as is shown by the experimental data of FIG. 5.

In other words, the inventive desalination apparatus increases the produced water efficiency by utilizing the thermal differences in a series, while conventional multi-stage evaporative apparatus repeatedly utilizes heat (calories) in parallel.

The treatment cost of a sea-water desalination apparatus is greatly affected by the form of the heat source. In a multi-stage flash system, which is an evaporative method in principle, cheap vapor has been used as the heat source, for example by thermal and atomic power generation.

Although not within the framework of the present invention, in the new desalination apparatus solar energy can also be used effectively as a heat source, and also a heat pump can be used as an assistant heat source. Therefore, the treatment costs of such a desalination system would be lower by the use of solar energy as the main energy, and a heat pump as the secondary heat source.

Now, as a conventional desalination method which uses solar energy as a heat source, there is the greenhouse method. When this known method is compared with the inventive procedure and apparatus, the latter is found to be prominent in at least the following two points: first, solar energy can be converted into thermal energy more effective; and second, product water efficiency is more prominent than in the greenhouse method.

Reverting now to the features of the present invention, it should be mentioned that FIG. 2 shows a somewhat modified condensing element, generally designated by the same numeral 2, but which is devoid of a central opening or duct (as shown in FIG. 1 at the center of the topmost element 2a), and the pipe 9 does not reach this topmost element. This illustration has also been used to show a somewhat different heating inlet pipe 13 in the form of a spout, similar to that form in FIG. 1 for the lowermost element 2b.

It should be understood, of course, that the foregoing disclosure relates only to preferred embodiments of the invention and that it is intended to cover all changes and modifications of the example described which do not constitute departures from the spirit and scope of the invention.

What I claim is:

1. A desalination apparatus comprising, in combination, at least three evaporating-condensing elements coaxially superposed in a vertical structure, with circumscribing rims and inwardly declining bottom diaphragms; a feed tube above the topmost one of said elements for introducing salt water to be desalinated; said diaphragms having upwardly diverging inner walls defining central ducts which constitute an axial passageway through the sturcture; liquid-conveying discharge pipes leading from each of said elements to the next lower element, except for the lowermost one of said elements, which has instead a tube for discharging concentrated salt water; means for heating said lowermost element; a drain receiver below the lowermost one of said ducts for leading away condensed vapors; and condensation-promoting, drop-inhibiting layers applied to the undersides of at least some of said diaphragms, said layers being in the form of a metallic mesh.

2. A desalination apparatus comprising, in combination, at least three evaporating-condensing elements coaxially superposed in a vertical structure, with circumscribing rims sealed against a casing and inwardly declining bottom diaphragms; a feed tube above the topmost one of said elements for introducing salt water to be desalinated; said diaphragms having upwardly diverging inner walls defining central ducts which constitute an axial passageway through the structure; liquid-conveying discharge pipes leading from each of said elements to the next lower element, except for the lowermost one of said elements, which has instead a tube for discharging concentrated salt water; means for heating said lowermost element; a drain receiver below the lowermost one of said ducts for leading away condensed vapors; and condensation-promoting, drop-inhibiting layers applied to the undersides of at least some of said diaphragms, said layers being in the form of a woven material.

3. A desalination apparatus comprising, in combination, at least three evaporating-condensing elements coaxially superposed in a vertical structure, with circumscribing rims sealed against a casing and inwardly declining bottom diaphragms; a feed tube above the topmost one of said elements for introducing salt water to be desalinated; said diaphragms having upwardly diverging inner walls defining central ducts which constitute an axial passageway through the structure; liquid-conveying discharge pipes leading from each of said elements to the next lower element, except for the lowermost one of said elements, which has instead a tube for discharging concentrated salt water; means for heating said lowermost element; and a drain receiver below the lowermost one of said ducts for leading away condensed vapors; wherein the separation between said elements is between 15 and 20 millimeters in said structure.

4. A desalination apparatus comprising, in combination, at least three evaporating-condensing elements coaxially superposed in a vertical structure, with circumscribing rims sealed against a casing and inwardly declining bottom diaphragms; a feed tube above the topmost one of said elements for introducing salt water to be desalinated; said diaphragms having upwardly diverging inner walls defining central ducts which constitute an axial passageway through the structure; liquid-conveying discharge pipes leading from each of said elements to the next lower element, except of the lowermost one of said elements, which has instead a tube for discharging concentrated salt water; means for heating said lowermost element; a drain receiver below the lowermost one of said ducts for leading away condensed vapors; and a vertical, vapor-condensing and feed conveying cooling pipe projecting with its top into said topmost element, below the water level therein, and passing downward through said axial passageway and drain receiver.

5. The desalination apparatus as defined in claim 4, wherein said heating means is in the form of a heat source placed below said lowermost element.

6. The desalination apparatus as defined in claim 4, wherein said heating means is in the form of a pipe for supplying hot water to said lowermost element with a temperature as high as or higher than that of the salt water introduced into said lowermost element.

7. The desalination apparatus as defined in claim 4, wherein said ducts of the diaphragms diverge outwardly.

* * * * *